Dec. 18, 1928.
J. H. HECKER
CHEESE CURD KNIFE
Filed June 15, 1927
1,695,761
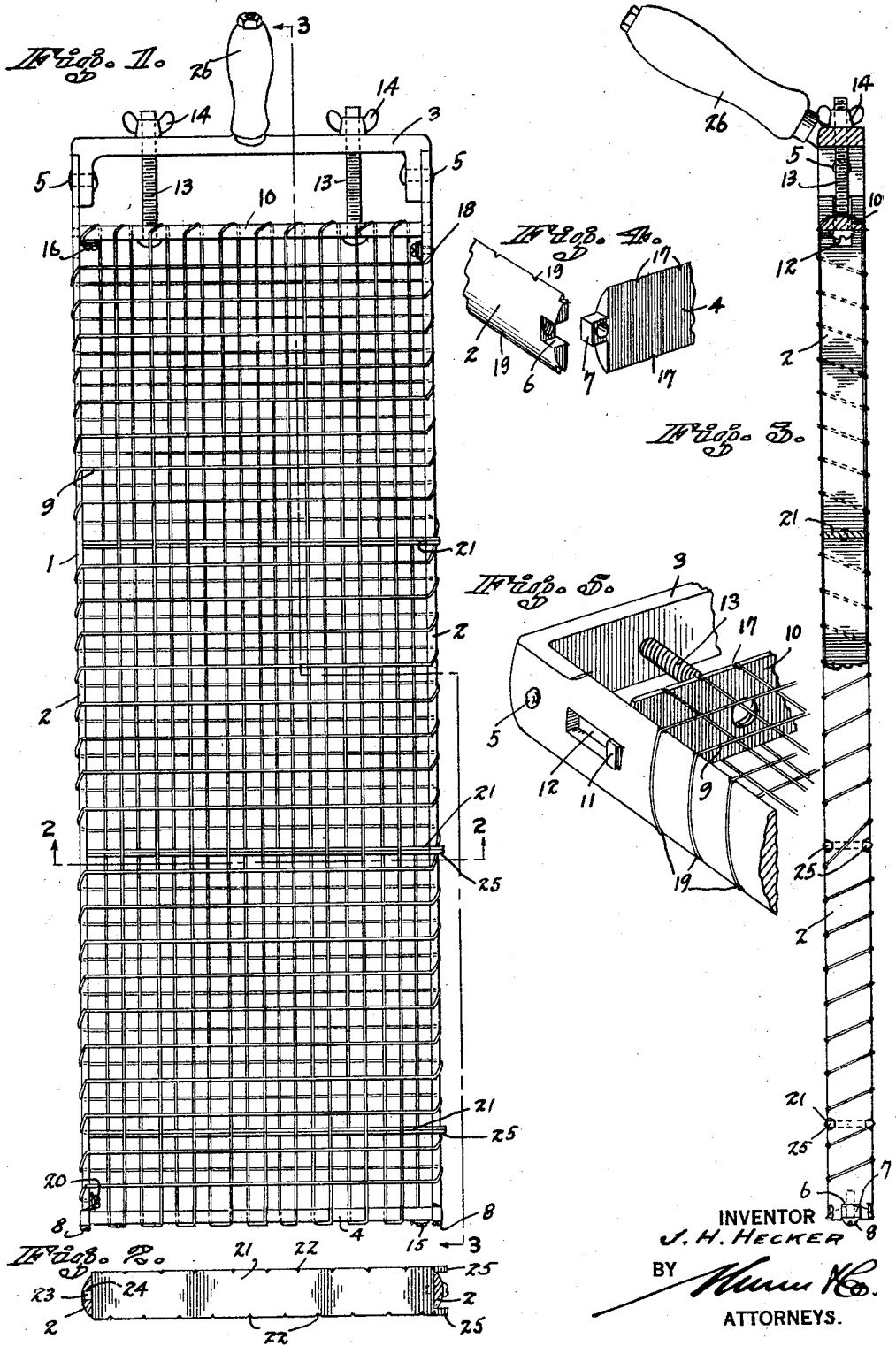
INVENTOR
J. H. HECKER
BY
ATTORNEYS.

Patented Dec. 18, 1928.

1,695,761

UNITED STATES PATENT OFFICE.

JOHN H. HECKER, OF GARDNERVILLE, NEVADA.

CHEESE-CURD KNIFE.

Application filed June 15, 1927. Serial No. 199,052.

My invention relates to improvements in cheese curd knives, and it consists in the combinations, constructions and arrangements hereinafter described and claimed.

An object of my invention is to provide a cheese curd knife which combines two of the standard types of cheese knives into one, whereby the operator can cut the coagulum of milk into a plurality of cubes by merely moving the knife across the length of the vat for dividing the cheese coagulum into long strips, and then moving the vertical knife across the width of the vat for dividing the strips into cubes. Of course, the vat is larger in area than the knife and the knife will have to be moved across the vat a number of times in much the same manner as a field is ploughed.

A further object of my invention is to provide a device of the type described in which the cheese cutting means consists of a plurality of fine wires or steel blades so arranged that the cheese coagulum will be cut into small cubes when the knife is moved through the clabbered milk or coagulum in the manner just described.

A further object of my invention is to provide a device of the type described, which is simple in construction and which has novel means for keeping the wires taut.

Other objects and advantages will appear in the following specification, and the novel features of my invention will be particularly pointed out in the appended claim.

My invention is illustrated in the accompanying drawing forming a part of this application, in which—

Figure 1 is a plan view of the device;

Figure 2 is a section along the line 2—2 of Figure 1;

Figure 3 is a section along the line 3—3 of Figure 1; and

Figure 4 and Figure 5 are perspective views of portions of the device.

In carrying out my invention I provide a frame 1, consisting of side members 2, having a cross-sectional shape, as shown in Figure 2, and end members 3 and 4. The end 3 is secured to the sides 2 by rivets 5, or other suitable fastening means, while the end 4 is secured to the sides 2 in the manner shown in Figure 4. It will be noted from this Figure that the sides 2 have notches 6 for receiving projections 7 carried by the end 4. Screws 8, see Figure 1, or other suitable fastening means secure the tongues in place.

The wire 9 is stretched between the sides 2 and between the end 4, and a movable end 10. Reference to Figure 5 shows that the movable end 10 has tongues 11 which are slidably disposed in slots 12 and that the end 10 is moved toward or away from the end 3 by means of screws 13 and wing nuts 14.

The wire is stretched between the ends 4 and 10, starting at a point 15, see Figure 1, and ending at the point 16. The ends 4 and 10 are notched as at 17 for this purpose and Figure 2 clearly shows how the notches in the end 10 are staggered with respect to each other so that the notches 17 in the upper edge of the end are disposed midway between the notches in the lower edge. This causes the strands of wire extending longitudinally across the top of the knife to be spaced midway between the strands of wire extending across the bottom of the knife.

The same arrangement is carried out in the transverse wires. In this instance the wire is stretched from a point 18 and is wrapped around the sides 2 and extends from side to side across the top and bottom of the knife, as clearly shown in Figures 1 and 5. The notches 19 in the sides 2 are arranged in the same manner as the notches 17, thus causing the wire to extend at an angle, as clearly shown in Figure 3, when passing from the notches of the top of the knife to the notches on the bottom thereof. The other fastening means for the transverse wire is shown at 20, see Figure 1.

The sides 2 are braced with respect to each other by transverse bars 21, which are provided with notches 22, similar to the notches 17. The transverse bars 21 have trunnions 23 receivable in openings 24 in one of the sides 2 and have fork-shaped ends 25 adapted to receive the other side 2, see Figure 2.

From the foregoing description of the various parts of the device, the operation thereof may be readily understood.

The end 3 carries a handle 26, which is mounted at the angle shown in Figure 3, and this handle is grasped by the operator when using the knife. The knife is lowered vertically into the coagulum at a point adjacent to one end of the vat and is then drawn through the material while still being retained in its vertical position. The first row is cut adjacent to one side of the tank and the knife is moved longitudinally the entire distance of the tank in making this cut. The knife is then removed and is again inserted so as to make a second cut, which will be parallel to the first one. This operation is repeated until the entire width of the tank has been gone over.

As hereinbefore stated, the longitudinally and transversely extending wires are arranged so that the squares formed in the top of the knife are intersected by squares formed in the bottom of the knife, the result being a plurality of squares one-quarter the area of the larger squares. I found out from practice that the small squares should preferably be three-eighths or one-half inch long on each side, but this distance may be varied without departing from the spirit or scope of my invention. The knife in being moved back and forth throughout the length of the coagulum cuts the material into a plurality of strips which are square in cross section.

The vertical knife is now used and moved transversely to its former movement and in doing this the operator inserts the knife vertically into the vat adjacent to one corner thereof and then moves the knife in a parallel direction with the end of the vat, the plane of the knife extending at right angles to the end during this movement. After this row has been completed the knife is removed and reinserted into the coagulum at a point adjacent to the first row and is again moved transversely through the vat. This operation is repeated until the entire tank has been gone over. The result is the forming of a multitude of small cubes which permits the whey or moisture to be removed from the material. The cubes thus formed are more uniform than is possible when two different knives are used for making horizontal and vertical cuts and thus insures a more even cook; moreover, the small particles of coagulum which are the result of cutting with the old type of knife are materially reduced, thus resulting in a saving of the material.

The principal object of the entire invention is to provide a knife which will make a vertical and a horizontal cutting during the same operation.

Although I have shown and described one embodiment of my invention, it is to be understood that the same is susceptible of various changes and I reserve the right to employ such changes as may come within the scope of the appended claim.

I claim:

A cheese curd knife comprising a rectangular portable frame, short in width and relatively long in length, a handle secured to the shorter end of said frame, and a wire wrapped transversely around said frame, and then longitudinally around said frame, the wires crossing each other for making squares, the squares on one side of the knife being staggered with respect to the squares on the opposite side for causing the knife to cut strips one-quarter of the area of said squares.

JOHN H. HECKER.